Aug. 8, 1967  W. G. McCLEAN  3,334,824
FILAMENT WINDING APPARATUS
Filed Oct. 5, 1964  4 Sheets-Sheet 1

INVENTOR.
WILLIAM GEORGE McCLEAN
BY
Andrus & Starke
ATTORNEYS

INVENTOR.
WILLIAM GEORGE McCLEAN
BY
Andrus & Starke
ATTORNEYS

Aug. 8, 1967     W. G. McCLEAN     3,334,824
FILAMENT WINDING APPARATUS
Filed Oct. 5, 1964     4 Sheets-Sheet 3

INVENTOR.
WILLIAM GEORGE McCLEAN
BY
Andrus & Starke
ATTORNEYS

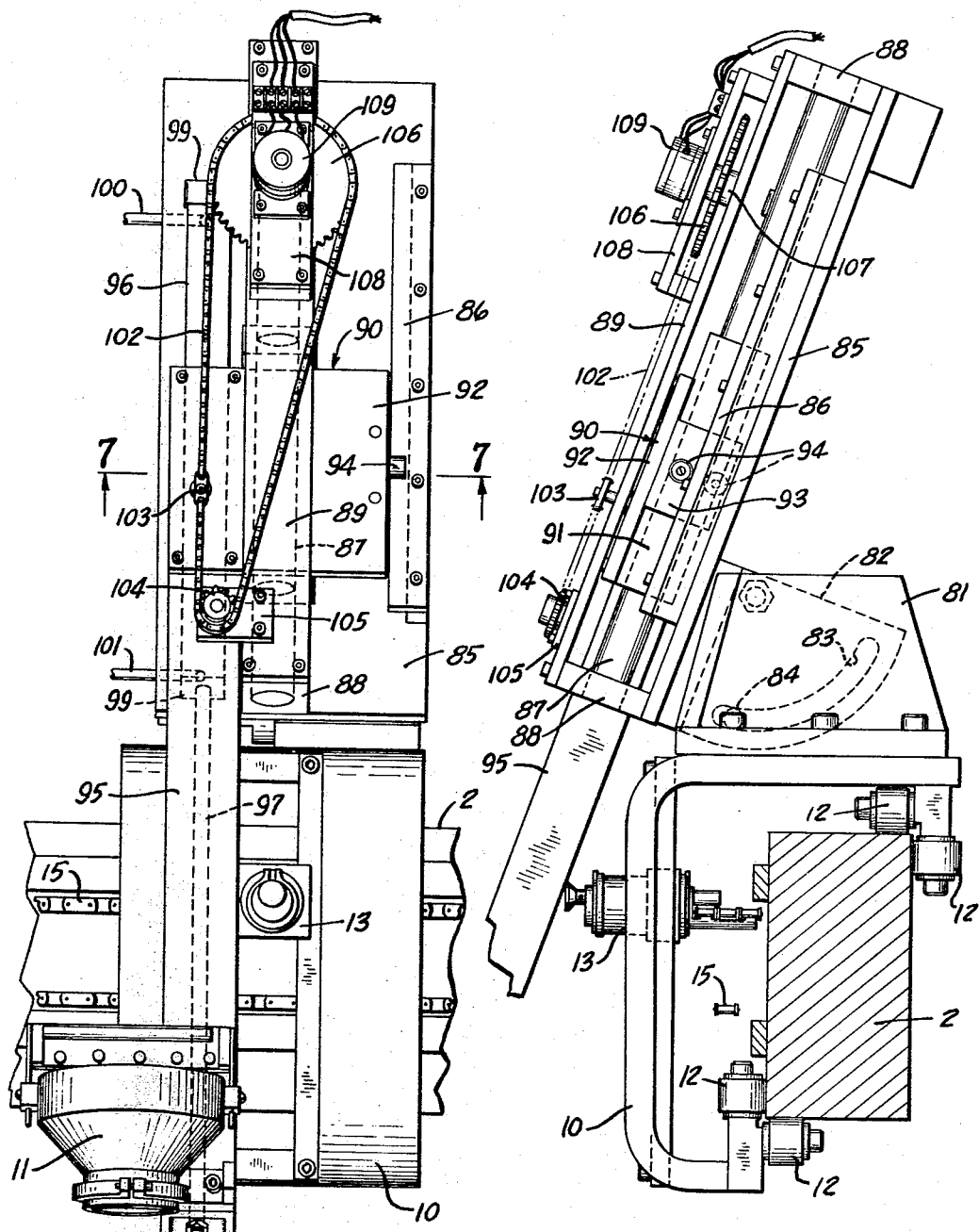

United States Patent Office 3,334,824
Patented Aug. 8, 1967

3,334,824
FILAMENT WINDING APPARATUS
William George McClean, Milwaukee, Wis., assignor to McClean-Anderson, Inc., Milwaukee, Wis., a corporation of Wisconsin
Filed Oct. 5, 1964, Ser. No. 401,571
11 Claims. (Cl. 242—7)

This invention relates to a filament winding apparatus and more particularly to a drive unit for a filament winding apparatus.

Tubular reinforced plastic articles are fabricated by winding a strand or filament of reinforcing material coated with resin about a mandrel in a generally helical pattern. In the usual process, the mandrel is rotated and the reinforcing strand is guided onto the mandrel by a winding head mounted on a carriage which reciprocates along the length of the mandrel to wind the strand in a series of superimposed layers with each layer having the opposite helix angle. The particular helix angle to be employed in the winding operation is determined by the relative speed between the mandrel rotation and the reciprocation of the winding head.

When winding large diameter articles, or when using a low helix angle, the winding head and carriage must normally move beyond the end of the mandrel before returning in its reverse stroke of travel. In this situation, where the strand overrides the mandrel, a slack condition is established in the strand which is usually taken up by a mechanical tensioning arm.

The present invention is directed to a filament winding machine which is programmed to vary the normal movement of the winding head and carriage at predetermined periods during the winding operation. For example, when winding large diameter vessels, or when using a low or shallow helix angle, the winding head is moved generally perpendicular to the axis of the mandrel at the ends of the stroke of travel of the carriage. This movement serves to prevent the slackened condition of the strand at the ends of the winding stroke and eliminates the mechanical takeup device which is normally used when winding at shallow helix angles.

More specifically, the drive unit includes a primary drive system which serves to rotate the mandrel. The primary drive comprises an endless chain section and a pair of shorter chain sections are secured in a side-by-side relation to the endless chain section. One of the shorter chain lengths periodically engages a sprocket which is operably connected to the carriage drive mechanism so that the carriage is driven periodically, in programmed sequence, during each cycle of travel of the endless chain. Similarly, the other shorter chain section periodically engages a sprocket which is operably connected to a cam drive mechanism, so that the cam drive is driven periodically during each cycle of the endless chain.

The cam drive includes a cam and a cam follower rides on the cam surface and actuates a potentiometer to develop a signal in accordance with the rotation of the cam. The signal from the potentiometer is balanced against, or compared to, a feedback signal generated by a feedback potentiometer in response to movement of the winding head. The signal error or differential acts through a hydraulic servo drive mechanism to move the winding head in relation to the carriage in the desired programmed sequence.

In the drive mechanism of the invention, the cam drive is only operated during given periods of the winding cycle. As the cam is not rotating continuously, the variations in contour of the cam surface can be less abrupt with the result that the signal developed by virtue of the rotation of the cam can be more accurately programmed.

The invention provides a remotely driven winding operation which is programmed very accurately so that both the carriage and winding head can vary their movement at predetermined periods during the winding cycle.

The drive mechanism is particularly useful when winding large diameter vessels, when using a low or shallow helix angle, or when winding vessels of complicated shapes. The winding head, by the programming of the cam, can be made to move downwardly at the end of the mandrel, which holds the strand against the mandrel end as the winding head reverses its path of travel and eliminates the long overshoot which is normally necessary, thereby shortening the required carriage travel and eliminating any slack in the strand.

Other objects and advantages will appear in the course of the following description.

The drawings illustrate the best mode presently contemplated of carrying out the invention.

In the drawings:

FIG. 5 is a front elevation of the winding head;

FIG. 6 is a side elevation of the winding head;

Figure 1:
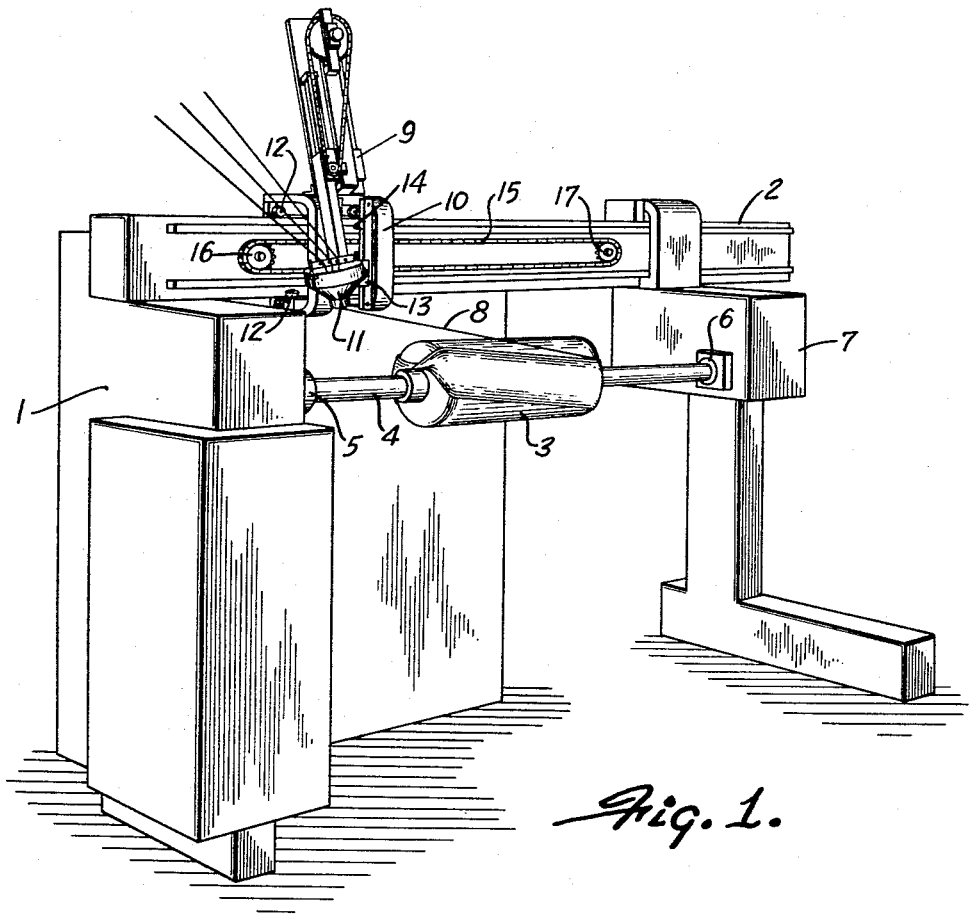
FIG. 1 is a perspective view of the filament winding machine of the invention.
Figure 4:
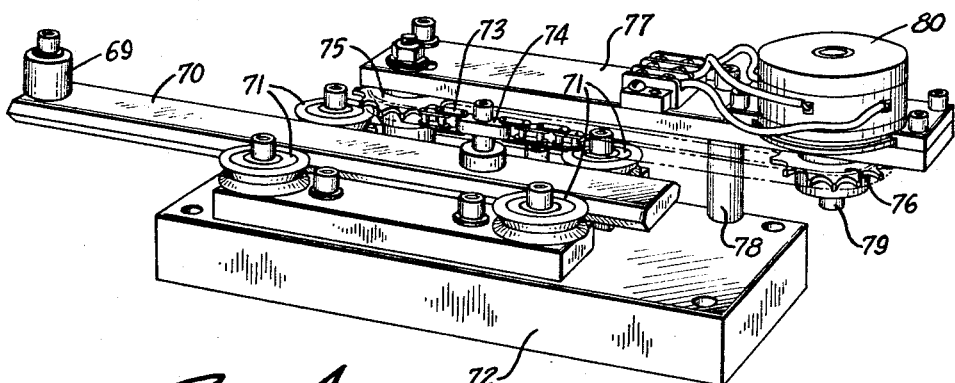
FIG. 4 is a perspective view of the cam follower assembly.
Figure 2:
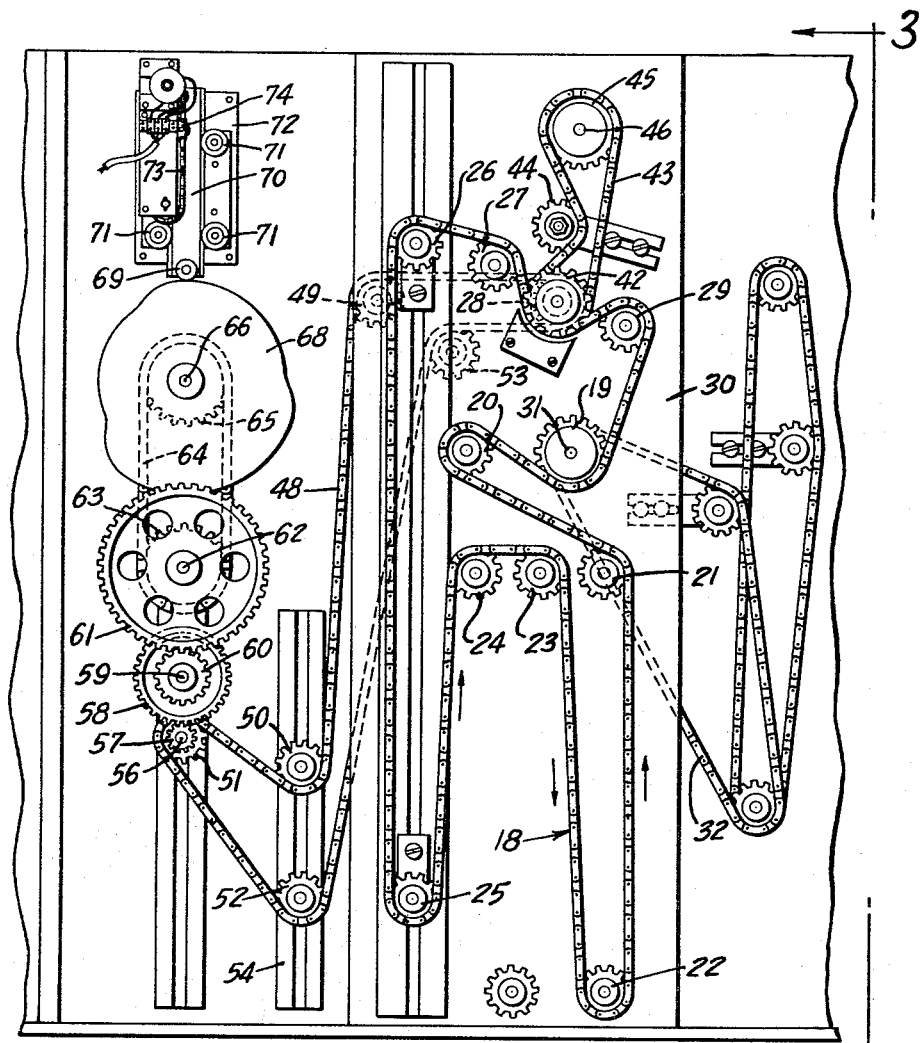
FIG. 2 is a schematic view of the drive system located within the outer casing.
Figure 7:
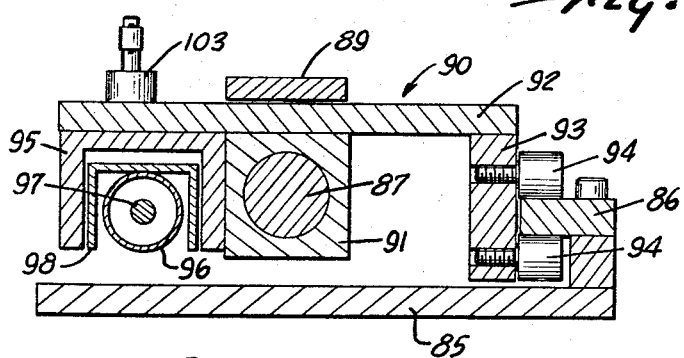
FIG. 7 is a transverse section taken along line 7—7 of FIG. 5.

The drawings illustrate a filament winding apparatus which comprises a base cabinet or casing 1 and a generally horizontal beam 2 extends outwardly from the casing. A mandrel 3 is secured to a shaft 4 which is disposed generally parallel to the beam 2. Secured to one end of shaft 4 is a spindle 5 which is operably connected to a drive mechanism located within the casing 1. The other end of the shaft 4 is connected to a spindle 6 journalled within tailstock 7 which is moveable along the beam 2.

A strand 8 of reinforcing material is guided onto the mandrel 3 by a winding head 9 supported on a carriage 10 which is mounted for reciprocating movement on the beam 2. The strand 8 can be in the form of substantially continuous unidirectional fibers, woven fabric, braided tubing, matting or the like. The fibrous material can be mineral fibers such as glass or asbestos; vegetable fibers such as cotton; animal fibers such as wool; synthetic fibers such as nylon, rayon or Dacron; or metal fibers such as steel wire.

The individual fiber ends, which make up the strand 8, pass through a bowl or receptacle 11 mounted on winding head 9 and containing a thermoplastic or thermosetting resin. The bowl serves to gather the ends together as well as coating the fibers with resin. The resin, at the time the strand is wound on the mandrel, can either being the liquid uncured state, or can be in a partially cured solid deformable state.

Glass fibers impregnated within an epoxide resin formed by the reaction of epichlorohydrin and bisphenol-A, as disclosed in Patent 2,801,227, provides an effective material to be used in the winding operation.

To enable the carriage 10 to reciprocate along the beam 2, the carriage is provided with a series of rollers 12 which ride on the beam 2. To move the carriage 10 along the beam, a slide 13 is slidably mounted in a vertical slot 14 formed in the carriage 10. The slide 13 is rotatably secured to an endless chain 15 which is trained around a drive sprocket 16 and an idler sprocket 17. As the chain 15 is driven, carriage 10 moves with the chain and as the carriage approaches one of the sprockets 16 and 17, the slide 13 will move vertically within the slot to permit the slide to follow the movement of the chain around the sprocket.

Figure 3:
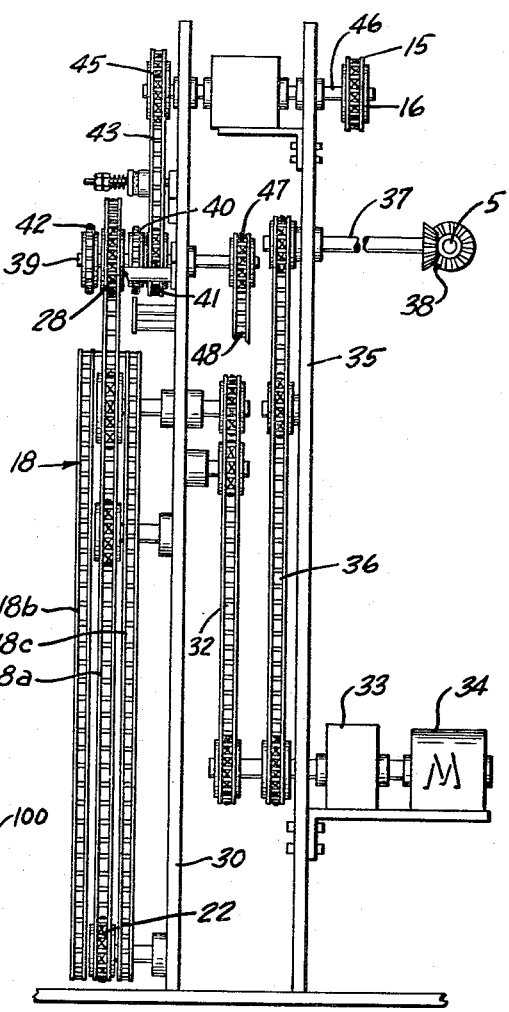
FIG. 3 is a view taken along line 3—3 of FIG. 2.

The drive mechanism for rotating the mandrel and reciprocating the carriage includes an endless chain 18 which is trained around sprockets 19, 20, 21, 22, 23, 24, 25, 26, 27, 28 and 29, carried by plate 30. Sprocket 19 is a drive sprocket and is secured to a shaft 31 journalled within plate 30. As shown in FIG. 3, shaft 31 is connected by a chain drive 32 to the output shaft of the variable speed transmission 33 driven by motor 34. The motor is mounted on a platform which extends outwardly from wall 35 of casing 1.

The motor 34 also serves to drive the mandrel 3. In this regard, the output shaft of transmission 33 is connected by chain drive 36 to a shaft 37, and the shaft 37 in turn drives spindle 5 through a pair of miter gears 38.

Figure 8:
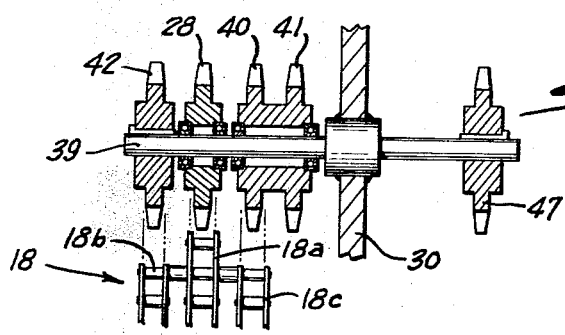
FIG. 8 is an enlarged sectional view of the primary drive chain sprocket assembly.

As best shown in FIG. 8, sprocket 28 is journalled on shaft 39 and a pair of sprockets 40 and 41 are secured together and journalled as a unit on shaft 39. In addition, a sprocket 42 is secured to the shaft 39 and serves to rotate the shaft which is journalled within an opening in plate 30.

The chain 18 is a conventional roller link chain and includes an endless, single-link section 18a which is engaged with the sprocket 28 and serves to rotate the sprocket on the shaft 39. In addition, a pair of link sections 18b and 18c are attached in side-by-side relation to the endless section 18a and extend through only a portion of the length of the chain. The section 18b is adapted to engage the sprocket 42 and the section 18c engages the sprocket 40. The sprockets 40 and 42 are spaced from the sprocket 28 a distance equal to the distance between the chain sections 18a, 18b and 18c. When only the single-link section 18a rides over the sprocket 28, there will be no transmission of motion of chain 18 to either of the sprockets 40 or 42. However, when the sections 18b or 18c move into engagement with the sprocket 42 or 40, the respective sprocket will thus be driven along with the sprocket 28.

During travel of the chain 18, the chain section 18b periodically engages the sprocket 42 and rotation of sprocket 42 acts through a cam drive mechanism to move the winding head 9. Similarly, the chain section 18c periodically engages the sprocket 40 which is operably connected through a chain drive to the carriage. The chain sections 18b and 18c may or may not be the same length and they may or may not be coextensive, depending on the desired relative movement of the winding head and carriage in a particular winding operation.

As previously mentioned, the sprocket 40 is periodically driven by chain section 18c and sprocket 41, which is secured to sprocket 40, is rotated in conjunction with sprocket 40. A chain 43 is engaged with the sprocket 41 and travels around a pair of sprockets 44 and 45. Sprocket 45 is secured to shaft 46 which is journalled within openings in plate 30 and wall 35. The opposite end of shaft 46 carries sprocket 16 which serves to drive the carriage drive chain 15. Thus, periodic rotation of sprocket 40 is transmitted through the chain drives 43 and 15 to drive the carriage in a programmed sequence.

As noted previously, the periodic rotation of sprocket 42 by chain section 18b acts through a cam operated servo mechanism to drive the winding head in a programmed sequence. The shaft 39, which is connected to sprocket 42, is journalled within plate 30 and carries a sprocket 47 which is engaged with an endless chain 48. The chain 48 is trained over sprockets 49, 50, 51, 52 and 53. Sprockets 50 and 52 are adjustably mounted on guide blocks 54 so that their position can be adjusted and the tension on the chain can be readily varied. Sprocket 51 is similarly adjustably mounted on a guide block 55.

Sprocket 51 is mounted on a shaft 56, and the shaft also carries a pinion 57 which engages a gear 58 secured to shaft 59. The shaft is journalled within a block, not shown, which is slidable within the guide member 55.

Shaft 59 also carries a gear 60 which meshes with the large gear 61 on shaft 62. Shaft 62, in turn, carries a sprocket 63 which is connected by chain 64 to a sprocket 65 mounted on shaft 66. A cam 67 is also secured to the shaft 72.

The outer periphery of cam 67 defines a cam surface 68 and the follower 69 rides along the surface 68 as the cam rotates. The follower 69 is journalled on the lower end of a slide 70 which is mounted for sliding movement between a series of rollers 71 carried by plate 72.

The slide 70 is connected to an endless chain 73 by connector 74, and the chain 73 is trained over sprockets 75 and 76, which are journalled on the underside of plate 77. Plate 77 is mounted in spaced relation to plate 72 by legs 78. Sprocket 76 is secured to a shaft 79 which is journalled within the plate 77, and the outer end of the shaft is connected to a standard potentiometer 80. With this construction, the cam follower 69 will ride on the cam surface 68 and the slide 70 will move vertically in accordance with the contour of the cam surface. Vertical movement of the slide 70 will move the chain 73, which in turn will rotate the sprocket 76 and actuate the potentiometer 80 to generate a primary signal.

To mount the winding head 9 on the carriage 10, a generally L-shaped mounting plate 81 is secured to the upper surface of the carriage and is adjustably connected to a plate 82 on the winding head 9. The plate 82 is provided with a curved or arcuate slot 83 and a bolt 84 extends through the slot and through a suitable opening in mounting plate 82 to connect the plate 82 to the mounting bracket 81. The curved slot 83 provides an angular adjustment for the winding head 9 with respect to the carriage 10 so that the winding head can be tilted in a vertical plane to vary the angularity as desired.

The winding head 9 includes a base plate 85 which is connected to the plate 82 and a guide rail 86 is secured to a side edge of the base plate. In addition to guide rail 86, a cylindrical guide rod 87 is mounted on end supports 88 and is spaced above the base plate 85. The upper ends of the end supports are connected by a plate 89.

A slide assembly, indicated generally by 90, is adapted to slide relative to the base plate 85 on the rail 86 and the guide rod 87. The slide assembly 90 includes a block 91 having an opening which receives the guide rod 87. Secured to the upper surface of block 91 is a top plate 92 and a side plate 93 extends downwardly from the top plate and carries a pair of rollers 94 which ride on the upper and lower surfaces of the rail 86. Thus, the slide assembly 90 can move relative to the base plate with the block 91 sliding on the guide rod 87 and the rollers 94 riding along the upper and lower surfaces of the rail 86.

A channel-shaped arm 95 is secured to the top plate 92 of the slide assembly and extends downwardly toward the mandrel 3. The lower end of the arm 95, as best shown in FIG. 5, carries the bowl or receptacle 11 which guides the strand 8 onto the mandrel.

The arm 95 and the depending bowl 11 are moved in and out toward the mandrel 3 by a cylinder 96 which is disposed within the channel-shaped arm 95. A piston rod 97 extends from the lower end of the cylinder and is attached to the arm 95. Enclosing the cylinder 96 is a U-shaped sheath 98 and the sheath is supported at its ends by supports 99 which are secured to the base plate 85.

The piston rod 97 is moved relative to the cylinder 96 by hydraulic fluid which is introduced into the cylinder through lines 100 and 101. By introducing fluid into the line 100, the piston and piston rod 97 will be moved downwardly within the cylinder to thereby move the arm 95 and guide bowl 11 downwardly toward the mandrel. Conversely, when the hydraulic fluid is introduced into the lower end of the cylinder 96 through line 101, the piston and piston rod 97 will be moved upwardly to thereby move the arm 95 upwardly. The bowl 11, or guide mechanism for the strand, is moved toward and away from the mandrel in a programmed sequence depending on the particular article being wound. For example, when winding large diameter cylinders, the arm 95 and guide bowl 11 can be moved downwardly in a direction generally toward the axis of the mandrel when the carriage reaches its end point in its reciprocating stroke of travel. At this time the carriage will dwell, while the mandrel continues to rotate, and by moving the guide mechanism in toward the mandrel, the strand will be wrapped around the end of the mandrel. The guide mechanism will then be moved upwardly away from the mandrel and the carriage will start its return stroke of travel. With this procedure, the long override of the carriage is eliminated and yet the strand remains in a taut condition.

The guide mechanism or bowl 11 can also be moved relative to the carriage at predetermined intervals in the winding operation when winding complex shapes, such as cones or hourglass-shaped articles.

The movement of the arm 9 is adapted to actuate a feedback mechanism which generates a feedback signal, and the feedback signal is compared with the primary signal from potentiometer 80 to produce an error signal which controls the supply of hydraulic fluid to cylinder 96. As best shown in FIG. 5, an endless chain 102 is connected to the plate 92 of slide assembly 90 by a connector 103. The chain 102 is engaged with a sprocket 104, rotatably supported on bracket 105 extending laterally from plate 89, and a sprocket 106 secured to a shaft 107. The shaft 107 is supported for rotation by a plate 108 spaced outwardly from plate 89, and the outer end of the sprocket shaft 107 is operably connected to a feedback potentiometer 109, so that movement of arm 95 acts through chain 102 to actuate the feedback potentiometer and develops a feedback signal.

Figure 9:
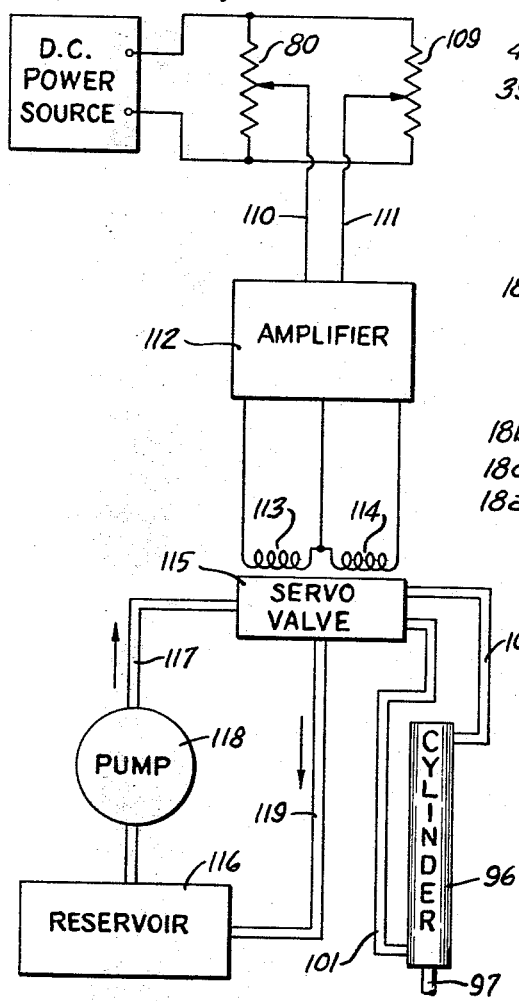
FIG. 9 is a schematic representation of the hydraulic control circuit.

The control circuit for the winding operation is shown in FIG. 9. The signal potentiometer 80 and the feedback potentiometer 109 are connected across leads from a suitable DC power source, and the wiper elements of the potentiometers are connected by leads 110 and 111, respectively, to amplifier 112. The windings 113 and 114 of the amplifier 112 are operably connected to a conventional servo valve assembly 115, which serves to control the flow of fluid between a reservoir 116 and cylinder 96. Hydraulic fluid is pumped from the reservoir 116 to valve mechanism 115 through a supply line 117 by a pump 118 and the hydraulic fluid is returned from the valve assembly to the reservoir through line 119. Hydraulic lines 100 and 101 are also connected between the servo valve mechanism 115 and the opposite ends of the cylinder 96.

The winding 113 is adapted to be energized when the signal potentiometer 80 develops a higher voltage than the feedback potentiometer 109. Energizing the winding 113 serves to actuate the valve mechanism 115 to open the connection between hydraulic lines 117 and 100 to supply fluid to cylinder 96 and to open the connection between line 101 and 119 to return fluid from the opposite end of the cylinder to the reservoir. The supply of fluid to line 100 will move the piston rod 97 and the arm 95 downwardly with respect to the mandrel.

When the voltage from the feedback potentiometer 109 equals the voltage of the signal potentiometer 80, there will be no voltage differential with the result that servo valve mechanism 115 is closed and there is no flow of hydraulic fluid to or from the cylinder 96.

When the voltage developed by the feedback potentiometer is higher than the voltage developed by the signal potentiometer 80, the winding 114 will be energized to actuate control valve mechanism 115 and bring line 117 in communication with line 101 to introduce fluid into the lower end of cylinder 96. Simultaneously, line 100 is brought into communication with line 119 to return fluid from the upper end of the cylinder to the reservoir 116. By introducing fluid into the cylinder through line 101, the piston rod 97 and arm 95 are moved upwardly away from the mandrel.

Before beginning the winding operation, the chain sections 18b and 18c of predetermined length are attached to the endless chain section 18a at the desired locations to provide for operation of the winding head and the carriage at predetermined periods during the overall winding cycle. Generally, one complete revolution or path of travel of the chain 18 will be equal to one-half or one complete winding cycle, with a complete winding cycle constituting the forward and return stroke of the carriage. In addition to selecting the proper chain lengths 18b and 18c, the gears 58, 60 and 61 are selected with the proper number of teeth to give one revolution of the cam 73 for each interval when the winding head drive is operational. More specifically, the gears are selected with the proper ratio to give a 360° rotation of the cam 73 during that period of time when the winding head drive is in operation.

During the winding operation, the mandrel is rotated continuously and the carriage drive is programmed to stop or dwell at various locations along the length of the mandrel to either build up thickness at certain locations along the length of the article, or to dwell at the ends of its stroke of travel. The winding head is programmed to move in and out when the carriage reaches its end points in its reciprocating stroke of travel, or to move in and out, toward and away from the mandrel, at locations along the length of the mandrel if the article being wound has a complex contour.

Thus, the drive for the winding head and the carriage are individually programmed and are both determined by the relative length and position of the chain sections 18b and 18c.

The winding head drive is operational only during predetermined periods of the overall winding cycle and only when chain section 18b is in engagement with sprocket 42. This means that the cam 73 is not rotating continuously, but only rotates when the winding head drive is operational, with the result that the variations in contour of the cam surface 74 can be less abrupt and the signal developed by virture of the rotation of the cam can be more accurately programmed.

The in-and-out movement of the winding head also develops a feedback signal and the feedback signal is balanced against the signal from the cam-operated potentiometer. The differential in voltage developed between the signal potentiometer and the feedback potentiometer acts through a servo valve mechanism to very accurately control the movement of the guide mechanism which is laying the strand onto the mandrel.

Various modes of carrying out the invention are contemplated as being within the scope of the following claims particularly pointing out and distinctly claiming the subject matter which is regarded as the invention.

I claim:

1. In a filament winding machine having a rotatable mandrel and a carriage disposed to move in a reciprocating path of travel along the mandrel, and having a winding head disposed to move relative to the carriage, a first endless chain section, means to drive said first endless chain section, a second chain section secured in a side-by-side relation with the first chain section and extending over only a portion of the length of the first chain section, second drive means connected to the carriage and operably engageable by the second chain section at spaced intervals during the winding operation for periodically driving the carriage, a third chain section secured in a side-by-side relation to the first chain section and extending only over a portion of the length of the first chain section, and third drive means connected to the winding head and operably engageable by the third chain section at spaced intervals during the winding operation for driving the winding head relative to the carriage.

2. In a filament winding machine, a rotating mandrel, a carriage disposed to move in a reciprocating path of travel along the mandrel, a winding head mounted on the carriage and disposed to guide a strand onto the mandrel, primary drive means, rotatable cam means, connecting means for periodically connecting the primary drive means to the cam means to thereby periodically rotate the cam means, said connecting means including a gear train designed to provide a 360° rotation of the cam means during each period when the cam means is connected to the primary drive means, and means operably connecting the winding head to said cam means for moving the winding head with respect to the carriage in accordance with rotation of the cam means.

3. In a filament winding machine, a rotating mandrel, a carriage disposed to move in a reciprocating path of travel along the mandrel, a winding head mounted on the carriage and disposed to guide a strand onto the mandrel, primary drive means, a rotatable cam, connecting means for periodically connecting the cam to the primary drive means to thereby periodically rotate said cam, means for mounting the winding head for reciprocating movement on the carriage, and means interconnecting the cam and the winding head for transforming rotary motion of the cam to reciprocating movement of the winding head.

4. In a filament winding machine having a rotatable mandrel and a carriage disposed to move in a reciprocating path of travel along the mandrel, and having a winding head disposed to reciprocate relative to the carriage, a first endless chain section, means to drive said first endless chain section, a second chain section secured in a side-by-side relation with the first chain section and extending over only a portion of the length of the first chain section, second drive means connected to the carriage and operably engageable by the second chain section at spaced intervals during the winding operation for periodically driving the carriage, a third chain section secured in a side-by-side relation to the first chain section and extending only over a portion of the length of the first chain section, a driven member operably engageable by the third chain section at spaced intervals during the winding operation, a rotatable cam, connecting means interconnecting said driven member and the cam to thereby rotate said cam during the interval in which the third chain section is operably engaged with said driven member, and means for converting rotary motion of the cam to reciprocating movement of the winding head.

5. The structure of claim 4 in which the connecting means includes a gear train designed to provide a given degree of rotation of the cam during each period of movement of said drive member.

6. In a filament winding machine, a rotatable mandrel, a carriage disposed to move in a reciprocating path of travel along the mandrel, a winding head mounted on the carriage and disposed to move in a reciprocating path of travel with respect to the carriage, primary drive means, a cam, means for periodically connecting said primary drive means to the cam for periodically rotating the cam, signal generating means responsive to the rotation of the cam for generating a primary signal in accordance with rotation of the cam, feedback signal generating means responsive to movement of the winding head for generating a feedback signal in accordance with movement of the winding head, means for comparing said primary signal and said feedback signal and developing a differential signal, and secondary drive means operably connected to the winding head and responsive to said differential signal for moving said winding head in accordance with said differential signal.

7. The structure of claim 6 in which said signal generating means and said feedback signal generating device comprise variable impedance devices.

8. The structure of claim 6 in which said secondary drive means is a hydraulic servo drive mechanism.

9. In a filament winding machine, a rotatable mandrel, a carriage disposed to move in a reciprocating path of travel along the mandrel, a winding head mounted on the carriage and disposed to move in a reciprocating path of travel with respect to the carriage with the path of travel of said winding head being generally normal to the path of travel of said carriage, primary drive means, means for periodically connecting said carriage to said primary drive means to periodically drive said carriage, a cam, means for periodically connecting said primary drive means to the cam for periodically rotating the cam during the cycle of travel, signal generating means responsive to the rotation of the cam for generating a primary signal in accordance with rotation of the cam, feedback signal generating means responsive to movement of the winding head for generating a feedback signal in accordance with movement of the winding head, means for comparing said primary signal and said feedback signal and developing a differential signal, and secondary drive means operably connected to the winding head and responsive to said differential signal for moving said winding head in accordance with said differential signal.

10. In a filament winding machine, a rotatable mandrel, a carriage disposed to move in a reciprocating path of travel along the mandrel, a winding head mounted on the carriage and disposed to move relative to the carriage and guide a strand onto the mandrel, primary drive means, cam means having a cam surface, connecting means for periodically connecting said cam means to the primary drive means to thereby periodically rotate said cam means, a follower to ride on said cam surface, a slide connected to the follower and mounted for linear movement, an endless member connected to the slide and disposed to move in an endless path in accordance with the linear movement of said slide, a variable impedance device operably connected to the endless member and disposed to generate a signal in accordance with movement of said endless member, feedback signal generating means responsive to movement of the winding head for generating a feedback signal in accordance with movement of the winding head, means for comparing said primary signal and said feedback signal and developing a differential signal, and second drive means operably connected to the winding head and responsive to said differential signal for moving said winding head in accordance with said differential signal.

11. The filament winding machine of claim 3, in which said primary drive means is an endless drive member and said connecting means comprises a second drive member secured in side-by-side relation with said endless drive member and extending over only a portion of the length of said endless drive member and disposed to periodically engage and drive said cam during movement of said endless drive member.

References Cited

UNITED STATES PATENTS

| 2,964,252 | 12/1960 | Rosenberg | 242—9 |
| 2,989,256 | 9/1961 | Lee | 242—9 |
| 3,023,135 | 2/1962 | Wiltshire | 242—7 |
| 3,039,707 | 6/1962 | Beck et al. | 242—9 |
| 3,052,419 | 9/1962 | Huck | 242—7 |
| 3,106,504 | 10/1963 | Carter | 242—7 |
| 3,133,236 | 5/1964 | McCauley | 242—11 |
| 3,146,962 | 9/1964 | Hardwick | 242—2 |

FRANK J. COHEN, *Primary Examiner.*

B. S. TAYLOR, *Assistant Examiner.*